United States Patent
Guiroux et al.

(10) Patent No.: US 11,336,680 B2
(45) Date of Patent: May 17, 2022

(54) TAILORED SECURITY CONFIGURATION OF LEAST-PRIVILEGE APPLICATIONS

(71) Applicant: Oracle International Corporation, Redwood Shores, CA (US)

(72) Inventors: Hugo Guiroux, Zurich (CH); Christopher Ferreira, Zurich (CH); Matthias Neugschwandtner, Perchtoldsdorf (AT); Roxana Bradescu, Davis, CA (US)

(73) Assignee: Oracle International Corporation, Redwood Shores, CA (US)

( * ) Notice: Subject to any disclaimer, the term of this patent is extended or adjusted under 35 U.S.C. 154(b) by 222 days.

(21) Appl. No.: 16/809,928

(22) Filed: Mar. 5, 2020

(65) Prior Publication Data

US 2021/0281597 A1    Sep. 9, 2021

(51) Int. Cl.
*H04L 29/00* (2006.01)
*H04L 29/06* (2006.01)
*G06F 21/62* (2013.01)
*H04L 69/16* (2022.01)

(52) U.S. Cl.
CPC ........ *H04L 63/1433* (2013.01); *G06F 21/629* (2013.01); *H04L 63/166* (2013.01); *H04L 63/20* (2013.01); *H04L 69/16* (2013.01)

(58) Field of Classification Search
CPC ...... G06F 21/54; G06F 21/629; G06F 21/577; G06F 2221/2113; H04L 69/16; H04L 63/20; H04L 63/1433; H04L 63/166; H04L 63/105
See application file for complete search history.

(56) References Cited

U.S. PATENT DOCUMENTS

| | | | | |
|---|---|---|---|---|
| 7,150,008 B2* | 12/2006 | Cwalina | .............. | G06F 8/70 717/126 |
| 7,437,718 B2* | 10/2008 | Fournet | ............ | G06F 21/577 717/133 |
| 7,526,758 B2* | 4/2009 | Hasse | ............... | G06F 11/366 714/38.11 |

(Continued)

OTHER PUBLICATIONS

Wu et al., "Automatically Partition Software into Least Privilege Components using Dynamic Data Dependency Analysis", IEEE, dated 2013, 11 pages.

*Primary Examiner* — Don G Zhao
(74) *Attorney, Agent, or Firm* — Hickman Becker Bingham Ledesma LLP

(57) ABSTRACT

Techniques for tailoring security configurations for least-privilege applications are provided. In one technique, multiple software artifacts associated with a software application are identified. For each software artifact, a call graph is generated, the call graph is added to a set of call graphs, and a set of dependencies for the software artifact is detected. The set of call graphs are combined to generate a merged call graph. One or more portions of the merged call graph are pruned to generate a pruned call graph. Annotation data is stored that associates elements in the pruned call graph with the set of dependencies for each software artifact. Based on the annotation data, reachable dependencies are identified. Based on the reachable dependencies, a set of security policies is generated for the software application.

20 Claims, 8 Drawing Sheets

(56) References Cited

U.S. PATENT DOCUMENTS

| | | | | |
|---|---|---|---|---|
| 7,617,489 B2* | 11/2009 | Peyton | ................ | G06F 21/577 |
| | | | | 717/133 |
| 8,230,477 B2 | 7/2012 | Centonze et al. | | |
| 8,881,288 B1* | 11/2014 | Levy | .................. | H04L 63/1408 |
| | | | | 726/25 |
| 9,256,739 B1* | 2/2016 | Roundy | .............. | H04L 41/0631 |
| 9,519,696 B1* | 12/2016 | Roth | .................... | G06F 16/258 |
| 10,409,995 B1* | 9/2019 | Wasiq | ............ | H04L 63/1433 |
| 10,609,041 B1* | 3/2020 | Wilczynski | ............ | H04L 63/105 |
| 10,614,218 B2* | 4/2020 | Peyton, Jr. | ............ | G06F 21/565 |
| 10,812,497 B2* | 10/2020 | Venkatramani | ..... | H04L 63/0272 |
| 2005/0055565 A1* | 3/2005 | Fournet | ................ | G06F 21/577 |
| | | | | 726/26 |
| 2005/0172126 A1* | 8/2005 | Lange | .................... | G06F 21/53 |
| | | | | 713/166 |
| 2008/0201760 A1* | 8/2008 | Centonze | ............. | G06F 21/604 |
| | | | | 726/1 |
| 2010/0100774 A1* | 4/2010 | Ding | .................. | G06F 11/3636 |
| | | | | 714/45 |
| 2011/0258617 A1* | 10/2011 | Park | .................... | G06F 11/3636 |
| | | | | 717/157 |
| 2012/0284792 A1* | 11/2012 | Liem | ..................... | G06F 9/4486 |
| | | | | 726/22 |
| 2013/0091487 A1* | 4/2013 | Chandra | ............... | G06F 21/563 |
| | | | | 717/106 |
| 2014/0344924 A1* | 11/2014 | McLachlan | ........... | G06F 21/629 |
| | | | | 726/22 |
| 2015/0089575 A1* | 3/2015 | Vepa | ....................... | G06F 21/62 |
| | | | | 726/1 |
| 2015/0161384 A1* | 6/2015 | Gu | ......................... | H04L 67/10 |
| | | | | 726/22 |
| 2015/0268941 A1* | 9/2015 | Nakaike | ............... | G06F 8/4443 |
| | | | | 717/152 |
| 2016/0182558 A1* | 6/2016 | Tripp | .................... | G06F 21/562 |
| | | | | 726/25 |
| 2017/0255544 A1* | 9/2017 | Plate | ..................... | G06F 21/577 |
| 2017/0337123 A1* | 11/2017 | Wang | ..................... | G06F 21/563 |
| 2018/0137279 A1* | 5/2018 | Peyton, Jr. | ............. | G06F 21/577 |
| 2018/0330097 A1* | 11/2018 | Dietsch | .................. | G06F 21/577 |
| 2020/0026851 A1* | 1/2020 | Dhankha | ................ | G06F 21/568 |
| 2020/0167155 A1* | 5/2020 | Lu | ............................. | G06F 8/75 |
| 2020/0210161 A1* | 7/2020 | Portela Parente | ...... | G06F 21/52 |
| 2020/0404007 A1* | 12/2020 | Singh | .................... | G06F 21/552 |
| 2021/0073107 A1* | 3/2021 | Sharma | ................ | G06F 11/3624 |
| 2021/0157924 A1* | 5/2021 | Antoniadis | ......... | G06F 11/3604 |

* cited by examiner

TAILORED SECURITY CONFIGURATION OF LEAST-PRIVILEGE APPLICATIONS

TECHNICAL FIELD

The present invention relates to software applications and, more particularly to, generating a tailored security configuration for software applications.

BACKGROUND

The least privilege principle in the context of software applications states that a software application should operate using the least set of privileges necessary to complete a computing job in order to increase security of a software application. While there are mechanisms to restrict what functions or operations an application can perform, the main process to ensure least privilege in software applications is a manual one. Manual specifying security configurations for an application is error prone and tedious, and often requires expert knowledge of the application.

Even if an application developer knows the code paths in the code of an application well, the application developer, in many instances, never really knows what privileges should be restricted due to dependencies created when linking third-party libraries or software packages, whose internal functions and calls are generally unknown to the application developer.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for automatically creating securing policies for software applications are provided. In one technique, software artifacts related to a software application are analyzed for dependencies and to create a call graph for each software artifact. The call graphs are combined to create a merged call graph. The merged call graph is analyzed (e.g., before execution of the software application) to identify runtime reachable paths through the merged call graph. Non-reachable paths are ignored. Dependencies related to nodes in the reachable paths are identified and included in one or more security policies that are applied at runtime when the software application is executed.

Embodiments improve computer-related technology by automatically configuring security mechanisms that restrict what a software application can perform. In this way, software applications are not executed in an over-privileged manner, resulting in more secure software applications. Also, developers of the software application are not required to manually configure the software mechanism or know anything about libraries or software packages upon which the software application relies. In other words, embodiments improve the security posture of a (e.g., GraalVM native image) application by automatically reducing the attack surface (and, thus, the risk of a security incident) to an extent that would otherwise only be achievable with significant manual effort by one or more experts.

Example Process

Figure 1:
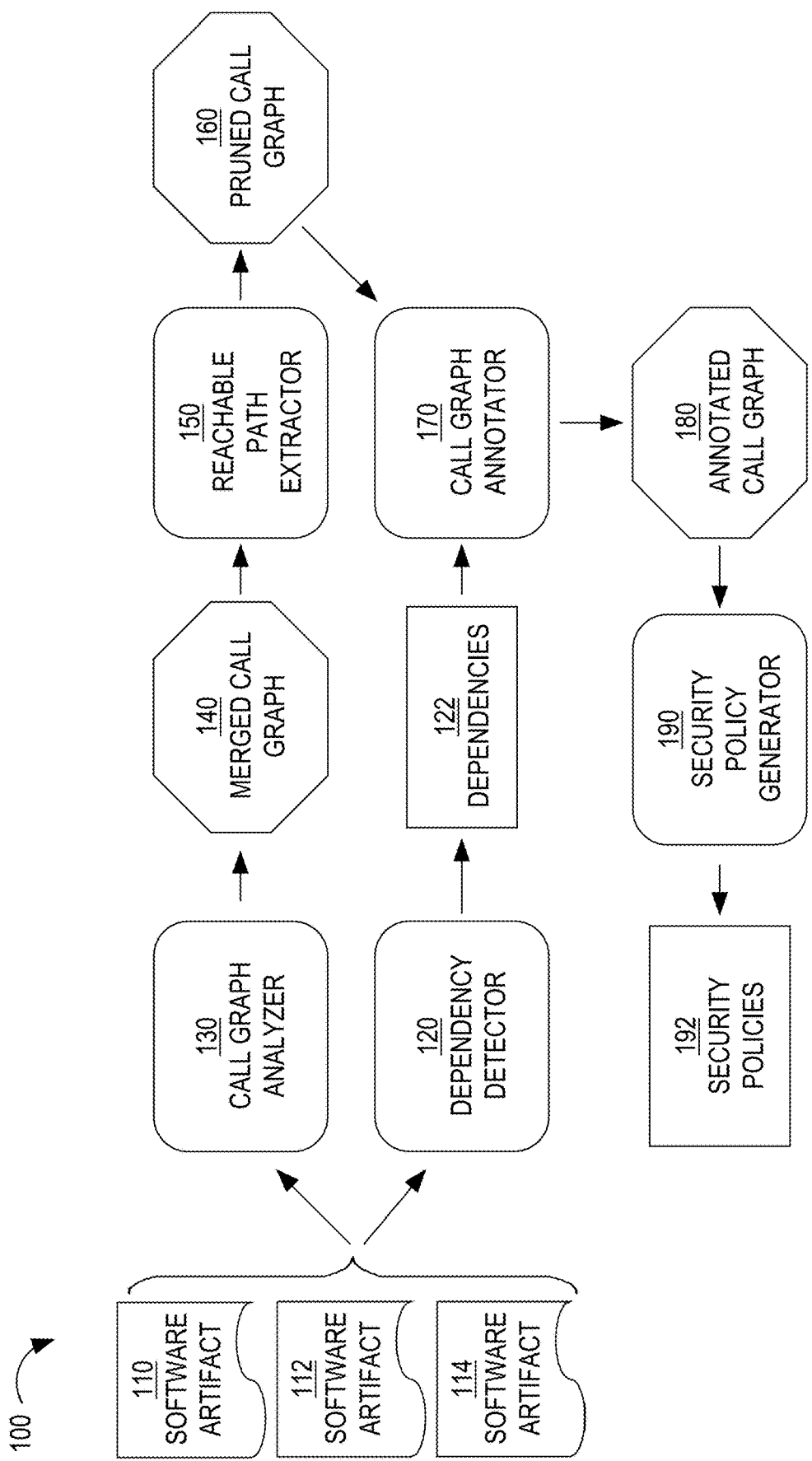
FIG. 1 is a block diagram that depicts an example process for generating security policies for a software application, in an embodiment.

FIG. 1 is a block diagram that depicts an example process 100 for generating security policies for a software application, in an embodiment. Process 100 may be implemented in hardware, software, or any combination of hardware and software.

Process 100 includes software artifacts 110-114, dependency detector 120, dependencies 122, call graph analyzer 130, merged call graph 140, reachable path extractor 150, pruned call graph 160, call graph annotator 170, annotated call graph 180, security policy generator 190, and security policies 192. While three software artifacts are depicted, process 100 may involve more or less software artifacts. Also, process 100 may be implemented in a different order. For example, in one implementation, dependency detector 120 executes concurrently with call graph analyzer 130 and, optionally, reachable path extractor 150. In another implementation, dependency detector 120 executes after pruned call graph 160 is generated.

Process 100 is based on an assumption that all application code that accesses (directly or transitively) OS resources and libraries is known at build time. To derive the build-time and run-time configuration parameters, process 100 involves a static analysis of the application and the libraries on which the application depends in order to find dependencies potentially used during application execution. For example, for a Java application, process 100 involves analyzing the Java application code and the runtime code (e.g., GraalVM Substrate VM), as well as libraries (e.g., the C standard library), and generating the dependency subset required by the Java application. Then, proper build-time configurations and/or run-time configurations are generated.

Software Artifacts

Software artifacts 110-114 are input to dependency detector 120 and call graph analyzer 130. A software artifact is software code that is analyzed for the purpose of generating security policies. Examples of major types of software artifacts include a software application and one or more libraries and software packages (e.g., a language runtime) used by the application. Specific types of software artifacts include source code, Java Virtual Machine (JVM) bytecode, LLVM intermediate representation (IR), assembly code, and the GraalVM native image runtime.

Dependencies

Dependency detector 120 implements one or more rules, whether written in software or in a separate manually-specified file, to identify (or detect) dependencies 122 in software code. Dependency detector 120 outputs a list of tuples (function, dependency) that will be leveraged by call graph annotator 170. A function A is said to introduce a dependency B if calling function A implies that B is necessary at runtime. Examples of B include a system call, a resource (such as the Transmission Control Protocol (TCP) stack (e.g., connecting to a server through TCP)), a library (e.g., .so for Linux and .dll for Windows), and a capability or a unit of privilege (e.g., read, update, delete). A specific dependency associated with a capability is not necessarily tied to a specific resource or data item. In an embodiment, dependency detection may be implemented in an intraprocedural fashion, whereas other embodiments may implement dependency detection in an interprocedural fashion, considering the context of multiple functions.

Figure 2:
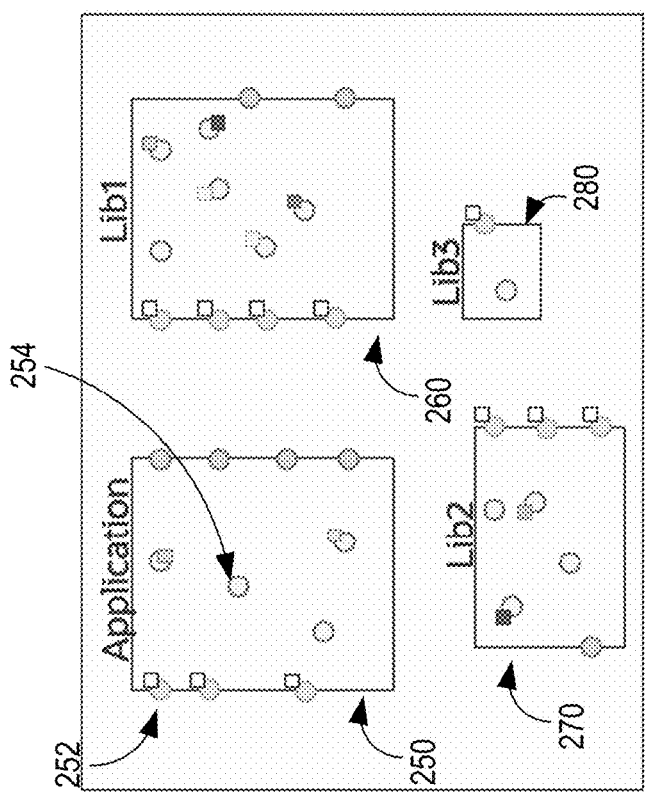
FIG. 2 is a block diagram that depicts example software artifacts before and after dependency detection, in an embodiment.
Figure 2:
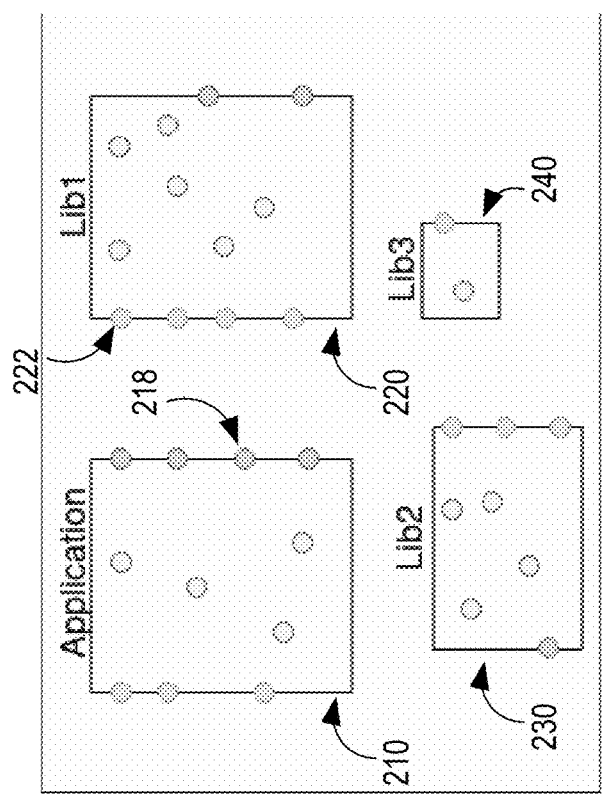

The following are examples of generic rules that may be used to detect several dependencies:
  a. Each entry point function of an artifact introduces a dependency on the artifact
  b. If a function contains the pattern: "mov $X, %rax; syscall," then the function introduces a dependency on the syscall X
  c. If a function calls syscall(X), then the function introduces a dependency on the syscall X The following are examples of ad-hoc rules that may be used to detect one specific dependency:
  a. Each function of the DatagramSocket class from the JDK introduces a dependency on the UDP stack
  b. Each function of the ServerSocket class from the JDK introduces a dependency on the TCP stack
  c. The function "setpriority" introduces a dependency on the CAP_SYS_NICE capability
  d. The function "getpwnam" introduces a dependency on the "/etc/passwd" file FIG. 2 is a block diagram that depicts example software artifacts before and after dependency detection, in an embodiment. Software artifacts 210-240 represent a set of software artifacts before dependency detection and software artifacts 250-290 represent the same set of software artifacts after dependency detection. Software artifact 210 is an application, while software artifacts 220-240 are different libraries that the application may rely on directly or indirectly.

Each software artifact includes one or more entry points, one or more internal functions, and, optionally, one or more function references. An entry point of a first software artifact is a function that can be called from one or more other software artifact to the first software artifact. An internal function of a software artifact is a function that is only called internally by the software artifact and processing stays within the software artifact. A function reference of a software artifact is a function that the software artifact calls to invoke another software artifact. For example, in FIG. 2, software artifact 210 may include a function reference 218 to entry point 222 of library 220 and, thus, software artifact 210 is dependent upon library 220. The circles within each software artifact represent internal functions while the circles on the edge of each software artifact represent either entry points or function references.

The depictions of software artifacts 250-280 include some circles with adjacent squares. The squares represent dependencies. A lack of a square adjacent to a circle indicates that the software artifact element represented by the circle does not have a dependency, at least one that represents a security risk. For example, entry point 252 of software artifact 250 is associated with a dependency while internal function 254 is not associated with a dependency.

Call Graph Analyzer

Call graph analyzer 130 analyzes software artifacts 110-114 to generate a call graph for each software artifact. Thus, if there are four software artifacts, then four call graphs are generated. Call graph analyzer 130 may be implemented by multiple call graph generators, one for each type of software artifact. For example, one call graph generator may be able to generate call graphs for JVM bytecode while another call graph generator may be able to generate call graphs for assembly code. Such use of multiple call graph generators may be required since various software artifacts might be from different code bases, such as a Java application using the libc library written in C. In this way, a separate call graph is generated. (A reachability analysis is performed on the merged call graph, described in detail below.)

One advantage of having a separate analysis for each software artifact is that the methods to perform the analysis, as well as when the analysis is performed, can be different for each component. For example, an object-oriented programming language requires a very precise points-to analysis so that the call graph can be derived with support for non-static calls (e.g., virtual calls). On the other hand, for a language like C, a points-to analysis might not be necessary as non-static calls are much less common.

An example call graph generator for Java is GraalVM native image while an example call graph generator for C and C++ is Static value-flow analysis (or SVF).

A call graph generator analyzes code of a software artifact and identifies calls from entry points to internal functions, entry points to function references, internal functions to internal functions, and internal functions to function references. A single entry point or internal function may call multiple internal functions and/or function references. Also, a single internal function or function reference may be called by multiple entry points and/or internal functions.

A call graph is a graph of nodes, where each node represents an entry point, an internal function, or a function reference. Nodes are connected by edges. An edge represents a call from (1) an entry point or internal function to (2) an entry point, an internal function, or function reference. Thus, an edge has a direction, making the graph a directed graph. A set of edges that are connected may result in a loop, such as an entry point calling an internal function, which calls the entry point.

Figure 3:
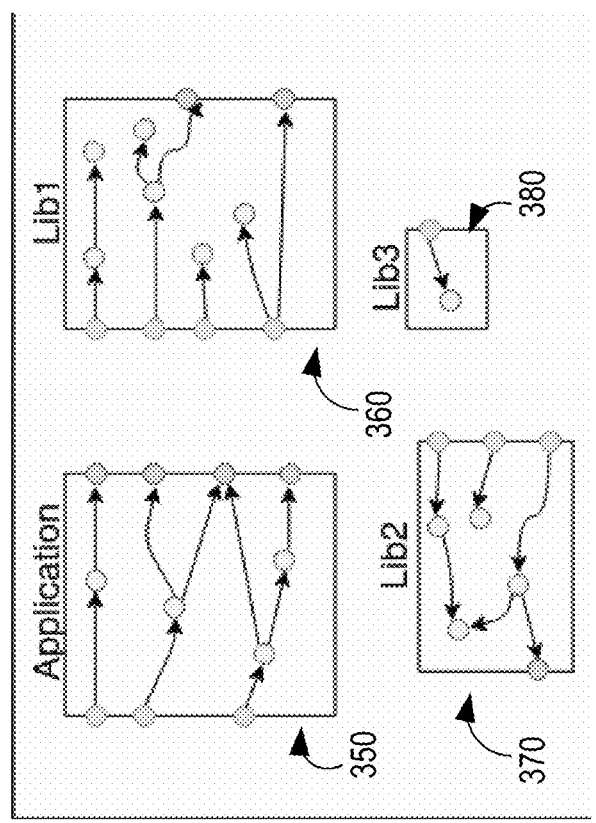
FIG. 3 is a block diagram that depicts a result of call graph analysis on software artifacts, in an embodiment.
Figure 3:
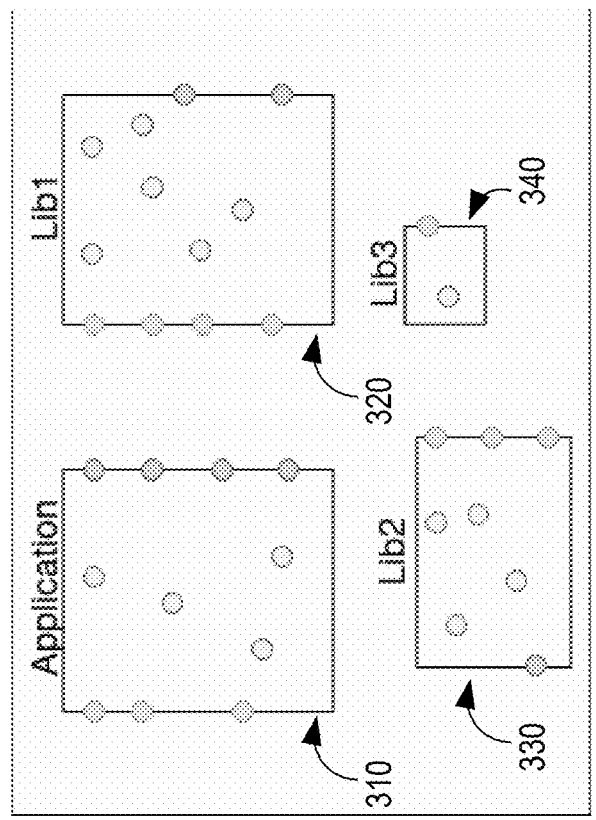

FIG. 3 is a block diagram that depicts a result of call graph analysis on software artifacts, in an embodiment. Software artifacts 310-340 are input and call graphs 350-380 are output. Directed paths in each call graph (1) begin with a node representing an entry point of the corresponding software artifact and (2) end either in a node representing an internal function or a node representing a function reference. Call graph 350 includes five paths, starting from three nodes representing entry points and ending in four nodes representing function references. Call graph 350 includes two nodes, representing internal functions, that each have two "downstream" edges. On the other hand, call graph 380 includes a single path that starts at a node representing the sole entry point and ends at a node representing the sole internal function.

Merging Call Graphs

After a call graph is generated for each software artifact 110-114, call graph analyzer 130 (or another component) resolves function references from one software artifact to another. Function reference resolution (or "inter-artifact resolution") involves connecting, or associating, a function reference from one software artifact to an entry point of another software artifact. When call graph analyzer 130 completes inter-artifact resolution, merged call graph 140 results.

Figure 4:
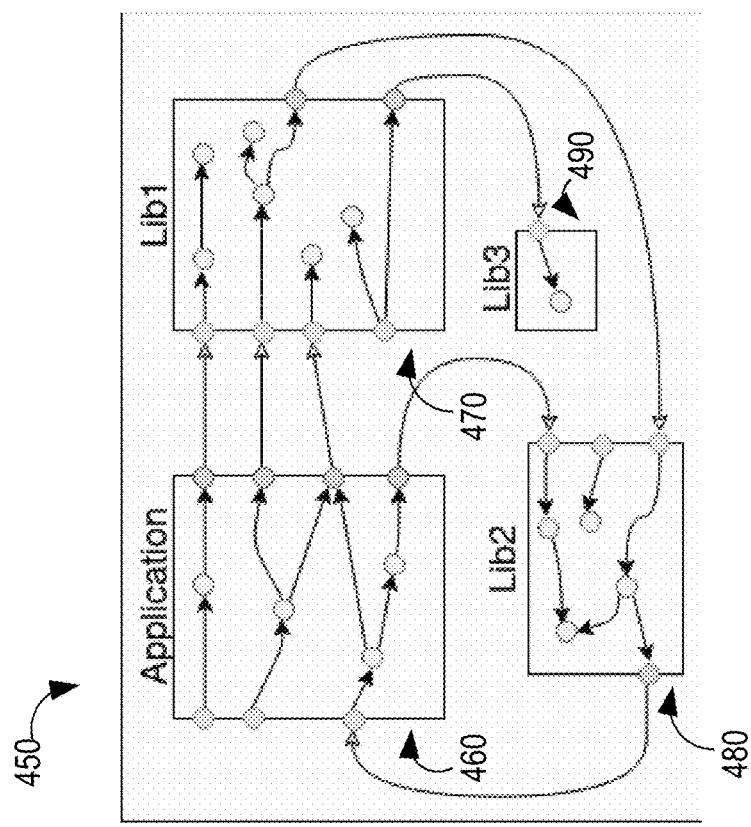
FIG. 4 is a block diagram that depicts an example merged call graph that is generated from multiple call graphs, in an embodiment.
Figure 4:
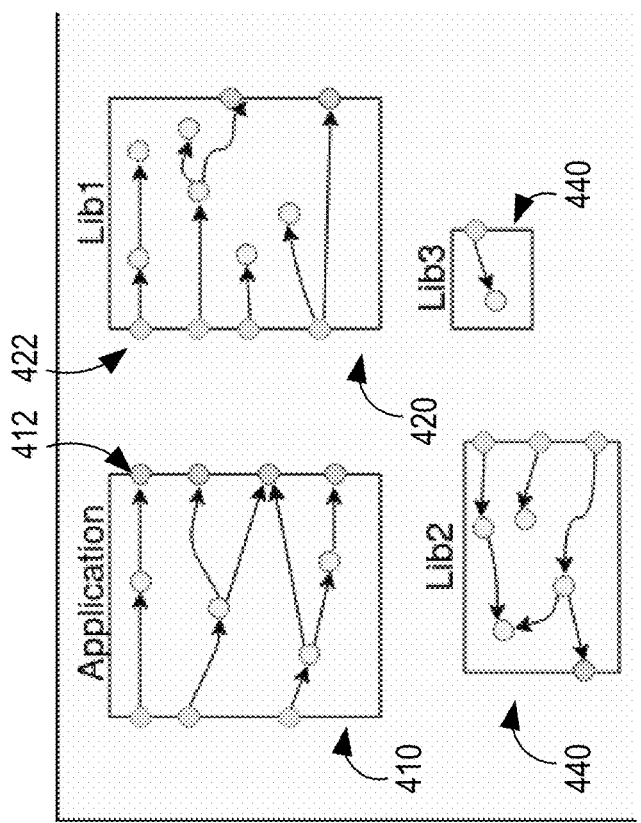

FIG. 4 is a block diagram that depicts an example merged call graph 450 that is generated from multiple call graphs 410-440, in an embodiment. From analyzing the underlying code of the respective software artifacts, call graph analyzer 130 determines that software artifact corresponding to call graph 410 includes a function reference 412 to entry point 422 of the software artifact corresponding to call graph 420. Thus, connecting or associating function references with their corresponding entry points involves analyzing the code of the software artifacts that includes the function references to determine whether a "source" artifact is calling an entry point in a "target" artifact.

Thus, merged call graph 140 comprises artifact-specific call graphs. Merged call graph 140 includes one or more edges (representing calls from one artifact to another) between two different artifact-specific call graphs. For example, there are three inter-artifact edges from software artifact 460 to software artifact 470 and one inter-artifact edge from software artifact 460 to software artifact 480. Also, there is one inter-artifact edge from software artifact 470 to software artifact 480, one inter-artifact edge from software artifact 470 to software artifact 490, and one inter-artifact edge from software artifact 480 to software artifact 460.

A function reference does not reference a specific artifact. For example, an artifact might declare a function reference to a function named "malloc". The library libc provides a function with this name but another library (e.g., tcmalloc) might provide their own "malloc" function as an alternative. Only one of those functions is actually called at runtime. If such a conflict occurs, then, during the merge of a per-artifact call graphs, two edges may be created starting from the function reference to both entry points (for completeness). In another embodiment, logic is implemented to decide which entry point will actually be called and only add one edge for that entry point (for precision).

Call graph analyzer 130 may performs its operations before, after, or concurrently with dependency detection performed by dependency detector 120.

Reachable Paths

After inter-artifact resolution is complete, reachable path extractor 150 extracts (or identifies) reachable paths in merged call graph 140, such as merged call graph 450. Reachable path extractor 150 accepts merged call graph 140 as input and identifies one or more portions of the merged call graph that is "reachable," resulting in a pruned call graph 160. A reachable portion of a merged call graph is a portion that represents code portions that might or could be executed or called during runtime. The reachable portion includes no portion that represents code portions that will never be executed or called at runtime.

A reachable portion may be identified in the following manner. First, an entry point to a software artifact is identified as callable when the corresponding software application is invoked. For example, the function "main" in a software application written in Java or C++ is identified as an entry point to a software artifact (representing that application). Reachable data is stored that indicates that that entry point is reachable. The node that represents that entry point is considered a "reachable node." From the merged call graph, one or more edges of the entry point are identified. Each identified edge is followed to a "connecting node" of the entry point (or a node that is connected to the entry point by one of the identified edges). A connecting node may be an internal function or a function reference. Reachable data is stored for each connecting node that indicates that that connecting node is reachable. From the merged call graph, for each connecting node, zero or more subsequent connecting nodes are identified. Thus, some connecting nodes might not be connected to any other "downstream" nodes. Other connecting nodes may be connected to only one subsequent connecting node and other connecting nodes may be connected to multiple subsequent connecting nodes. Reachable data is stored for each subsequent connecting node that indicates that the subsequent connecting node is reachable. A connecting node may be a function reference in one artifact while a subsequent connecting node (to which the connecting node is connected) may be an entry point in another artifact.

This process of following edges from reachable nodes continues until there are no more nodes in the merged call graph that can be reached. Any nodes in the merged call graph that are not associated with reachable data are considered unreachable and are candidates for removal or deletion from the merged call graph. A characteristic of each unreachable node is that such a node is not connected to by a reachable node that is upstream relative to the unreachable node. However, an unreachable node may be upstream relative to a reachable node. For example, an edge may connect an unreachable node to a reachable node, where the unreachable node is the source (or upstream) node and the reachable node is the target (or downstream) node.

Figure 5:
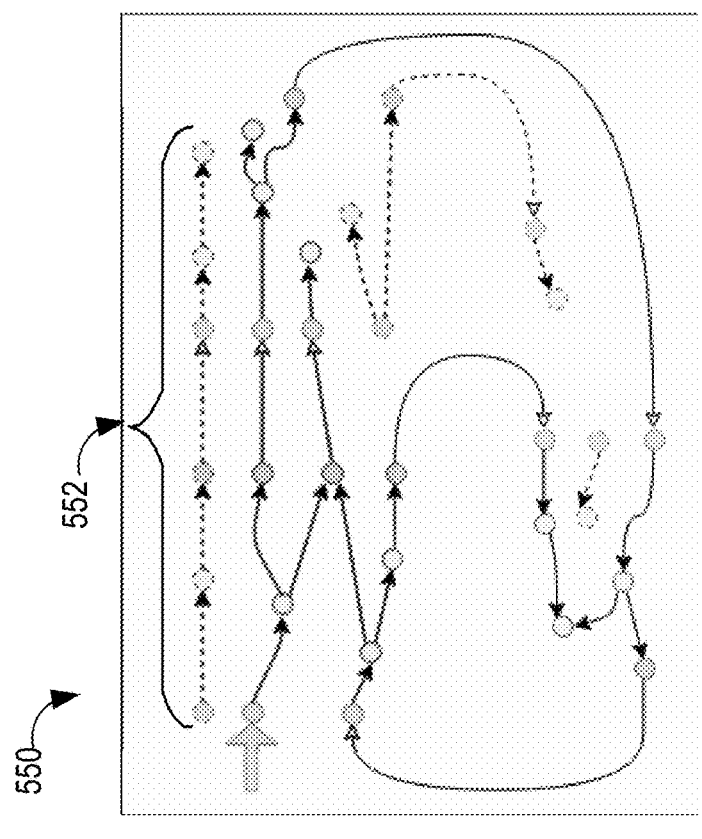
FIG. 5 is a block diagram that depicts an example merged call graph and an example pruned call graph, in an embodiment.
Figure 5:
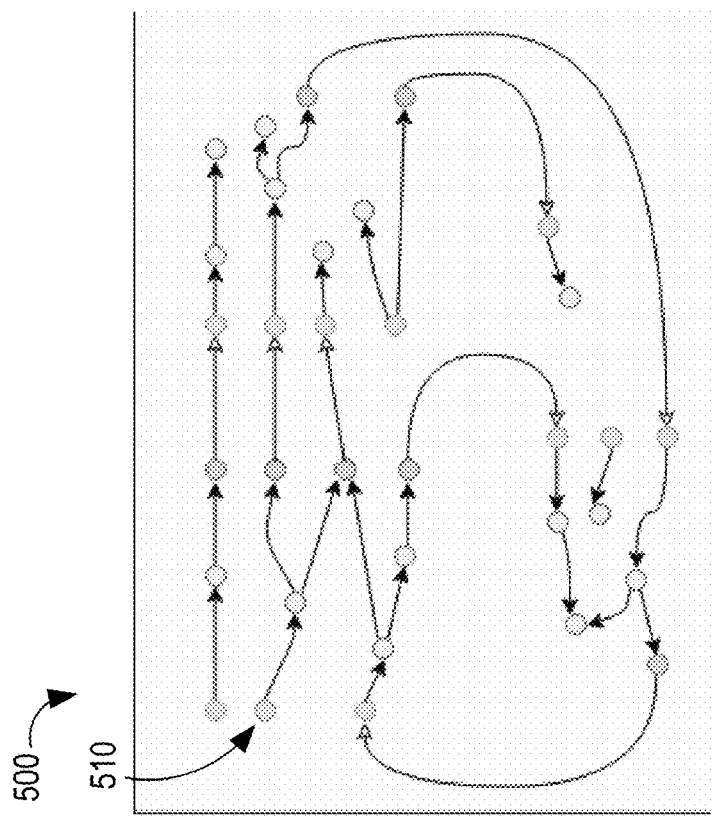

FIG. 5 is a block diagram that depicts an example merged call graph 500 that is similar to merged call graph 450, except without the borders defining the respective software artifacts, in an embodiment. Reachable path extractor 150 analyzes merged call graph 500 to identify an entry point 510 that may be called when the corresponding application is running. The dashed nodes and edges represent nodes and edges that are unreachable. Thus, portion 552 of merged call graph 500 is considered unreachable and may be pruned (or removed) or at least ignored in subsequent analysis when generating a list of reachable dependencies. Pruned call graph 550 includes two other node-edge segments (one

Call Graph Annotator

Call graph annotator 170 takes (1) pruned call graph 160 (e.g., pruned call graph 550) and (2) dependencies 122 (detected by dependency detector 120) as input and annotates pruned call graph 160 to generate an annotated call graph 180 as output. For each (function, dependency) tuple detected, the node corresponding to the entry point or internal function is annotated with the dependency. If a detected dependency is associated with a reachable node in pruned call graph 160, then the detected dependency is added to a list of reachable dependencies. Conversely, if a detected dependency is not associated with any reachable node in pruned call graph 160 (or is associated only with unreachable nodes), then the detected dependency is not added to the list of reachable dependencies.

Figure 6:
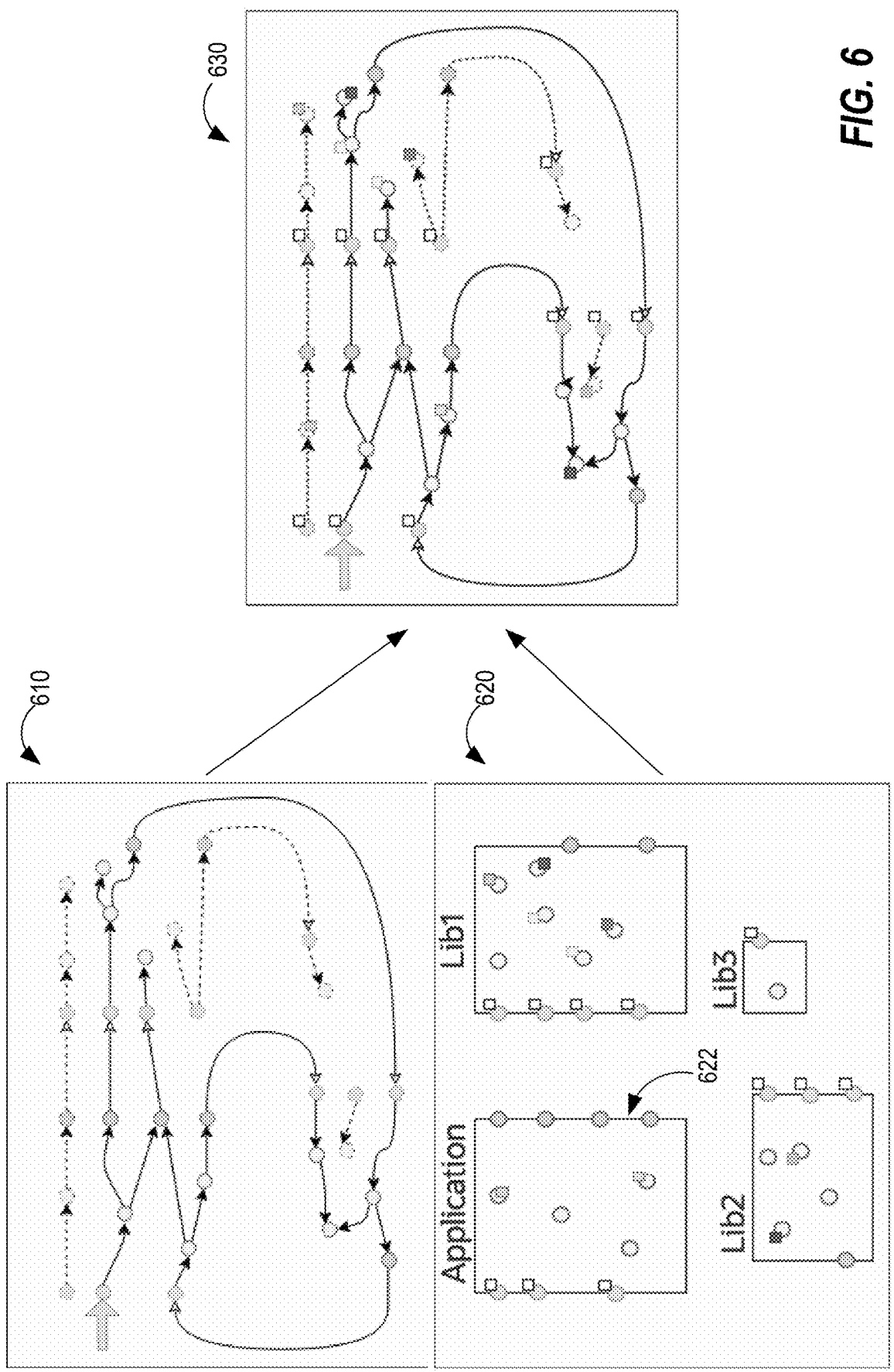
FIG. 6 is a block diagram that depicts an annotated call graph that is generated based on a pruned call graph and a set of dependences, in an embodiment.

FIG. 6 is a block diagram that depicts an annotated call graph 630 that is generated based on pruned call graph 610 and dependences 620, in an embodiment. Dependencies 620 is an example of dependencies 122. Each dependency in dependencies 620 is associated with an element or component of a software artifact, such as an entry point or internal function. In the depicted example, each entry point in each software artifact (depicted in dependencies 620) is associated with a dependency on the artifact according to rule a above (i.e., "Each entry point function of an artifact introduces a dependency on the artifact"). Entry points are functions and introduce dependencies, and are not dependencies themselves.

However, only a strict subset of the depicted internal functions are associated with a dependency. For example, software artifact 622 has four internal functions, two of which are associated with dependencies and the other two of which are not.

Call graph annotator 170 annotates pruned call graph 160 with dependencies 122 to generated annotated call graph 180, an example of which is annotated call graph 630. If a node in pruned call graph 610 is associated with a dependency (as indicated in dependencies 620), then that node is associated with that dependency. This annotation step may involve reachable and non-reachable nodes, as depicted in FIG. 6. In another example, the annotation step only involves considering reachable nodes in pruned call graph 160. Thus, unnecessary annotations are avoided.

As depicted in annotated call graph 630, some unreachable nodes are associated with dependencies. Dependencies associated with reachable nodes are then identified (e.g., by call graph annotator 170 or another component not depicted) by traversing only the reachable paths and identifying each reachable node, which is associated with a dependency. Names (or identifiers) of dependencies that are associated with a reachable node are recorded. Such dependencies are referred to as "reachable dependencies."

Out-of-Band Storage of Per-Artifact Dependency Annotated Call Graphs

In an embodiment, for an artifact-specific call graph, an optimized representation of an annotated version of the artifact-specific call graph is stored. The optimized representation contains only (a) entry points that are annotated with all dependencies that are reachable from the entry point and (b) the function references that are accessible from each entry point. Thus, no data about internal functions are stored in the optimized representation.

An optimized representation is not necessarily smaller in size than the corresponding annotated version since dependencies on each upstream node may be duplicated. An optimized representation is "optimized" in the sense that it is faster (e.g., constant time) to lookup the dependencies for a given entry point. Without an optimized representation, scanning all the sub-nodes reachable from the entry point can take considerable time.

By storing the optimized representation, if another software application that needs to be analyzed relies on the same software artifact (e.g., a library), then the optimized representation of that software artifact may be retrieved from stored and used to identify a set of reachable dependencies given the other software application, the software artifact, and any other software artifacts. In other words, the call graphs of any software artifacts having associated optimized representations do not need to be materialized.

Security Policy Generator

Security policy generator 190 accepts the set of names of reachable dependencies (derived from dependencies 122 and annotated call graph 180) as input and generates security policies 192 as output. A security policy is a configuration for a security mechanism. A security policy identifies a set of one or more dependencies or actions that a software application is allowed to make or call. A security mechanism applies one or more security policies to an action requested by an application. Examples of security mechanisms are AppArmor and Seccomp.

Security policy generator 190 translates a name or identifier of a reachable dependency (which may be in one (e.g., proprietary) format) into a format that is recognizable to a security mechanism. Different security mechanism may expect different formats.

Also, different security mechanisms may be associated with different types of dependencies. Thus, in an embodiment, for each dependency in the set of reachable dependencies), security policy generator 190 determines a type of that dependency and, based on the type, adds the dependency to a security policy for a corresponding security mechanism that is able to apply or process that dependency. A security policy may be a list of dependencies or an actual program comprising program code, such as code written in a high-level programming language. The program code includes data that identifies each dependency associated with that security policy.

In an embodiment, security policies are automatically generated. Examples of security policies include a whitelist of system calls needed by an application, a list of files that can be accessed by the application, whether a TCP or UDP stack is used, and a list of libraries needed by the application.

Containers

Containers are computing elements that sit on top of a physical server and its host operating system (OS) (e.g., Linux or Windows). Each container shares the host OS kernel and, at times, the binaries and libraries. Containers are relatively small (compared to virtual machines (VMs)) and reduce management overhead. Because containers share a common operating system, only a single OS needs management for bug fixes, patches, etc. Containers provide a way to virtualize an OS so that multiple workloads can run on a single OS instance.

An application running on an ordinary OS sees all resources (e.g., connected devices, files and folders, network shares, CPU power, quantifiable hardware capabilities) of that computer. However, programs running inside of a container can only see the container's contents and devices assigned to the container. Thus, an application expecting to "see" the whole computer, once run inside a container, only sees the resources (allocated to that container) and operates as if the allocated resources are all that is available. Several containers can be created on each operating system, to each of which a subset of the computer's resources is allocated. Each container may contain any number of applications or computer programs. These applications may run concurrently or separately and may interact with one another.

Containers are a way of packaging one (or multiple) applications with their dependencies, such as all the libraries required to run the application. This simplifies deployment in the cloud, as the hosting environment itself just needs to provide a run-time, such as Docker, for the container and no dependencies. Containers require both build-time configuration, which determines what parts are included in the container image, as well as run-time configuration, which determines the environmental parameters for executing the application. This configuration allows to define the OS dependencies subset available to an application executed in the container. For example, at run-time, the security mechanism Seccomp allows kernel system calls that an application uses to be whitelisted. As another example, the security mechanism AppArmor constrains accesses to the file system and network, while capabilities can be revoked to forbid privileged accesses to the application. However, configuring such mechanisms is a tedious and error-prone task.

Despite the relatively fast startup time and good overall performance, containers have a significant downside: their attack surface is large. As noted previously, application developers are typically unaware of all the dependencies in their own code, as well as the dependencies in libraries and software packages on which their application depend. Also, for simplicity, build configurations are often layered on top of images that provide a full OS stack, pulling in unnecessary functionality such as remote login daemons (ssh). The same applies to runtime configuration: the default privileges, which need to fit all possible applications, are unnecessarily generous for most applications. Therefore, the current industry consensus is that default container security is insufficient for multi-tenancy.

As a result, many containers run over-privileged with a default configuration that works for all applications running on those containers. A danger of a container being over-privileged is that an attacker might compromise an application running in the container and, as a result, gain a full (or almost full) set of privileges that are available to the container.

Minimal Containers

In an embodiment, a minimal container image is constructed, where only needed software artifacts (e.g., libraries) are included in the container image. This is a build-time configuration. The unnecessary software artifacts may be automatically determined after reachable sub-graphs are identified. Any sub-graphs that are unreachable are discarded. After discarding all unreachable sub-graphs, any software artifact that is not reflected in any reachable sub-graph is a candidate for excluding from the container image. For example, if none of a software artifact's entry points is reflected in a reachable sub-graph, then that software artifact may be excluded from the container image. In this way, the container image has a smaller memory footprint and disk footprint than if the software artifact was included in the container image. Also, the container that launches from loading the container image will be more secure since any vulnerabilities associated with the excluded software artifact are non-existent in the container, unless those vulnerabilities are shared with another software artifact that is included in the container image.

This embodiment is independent of embodiments described herein regarding "hardened" applications, which are applications for which one or more security policies are generated that indicate only reachable dependencies. Thus, in one embodiment, a hardened application is generated using techniques described herein where the hardened application operates independent of a (or outside any) container. In another embodiment, a minimal container image is generated that includes one or more hardened applications. In yet another embodiment, a minimal container image is generated that does not include any hardened application.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
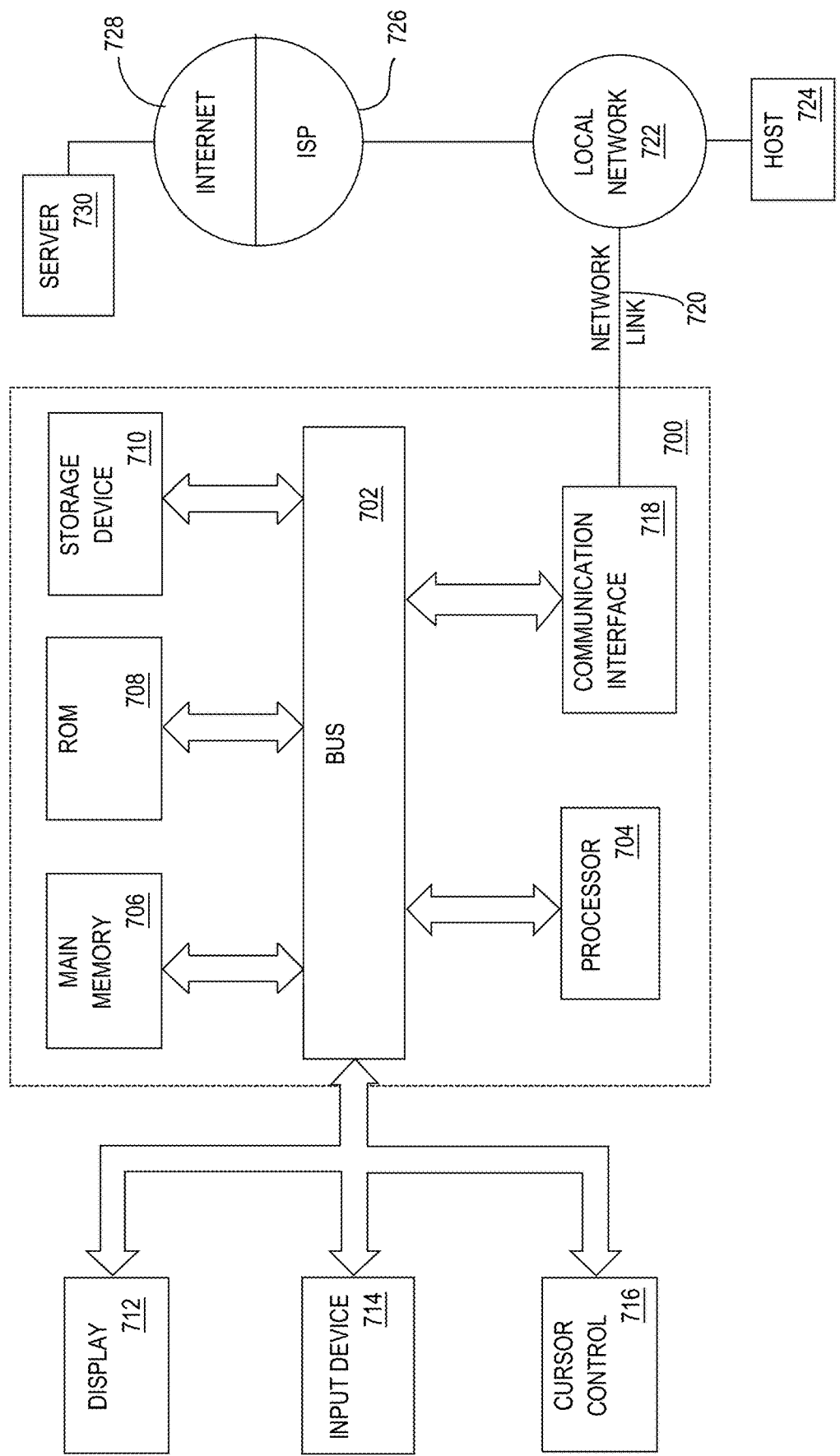
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
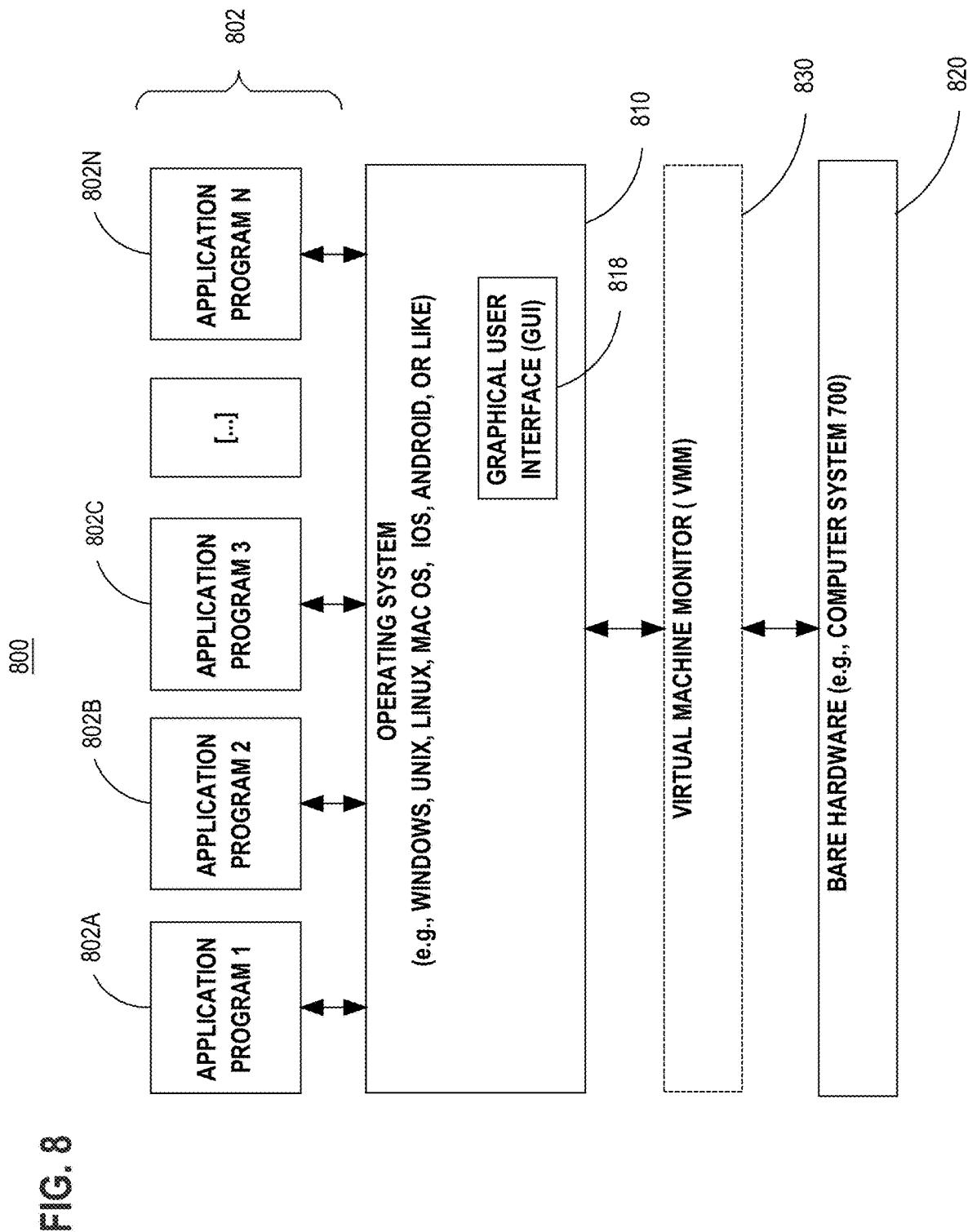
FIG. 8 is a block diagram of a software system that may be employed for controlling the operation of the computing system, in an embodiment.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 800 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
 identifying a plurality of software artifacts associated with a software application;

for each software artifact of the plurality of software artifacts:
  generating a call graph for said each software artifact;
  adding the call graph to a set of call graphs for the software application; and
  detecting a set of one or more dependencies for said each software artifact;
wherein the set of call graphs includes (1) a first call graph that was generated for a first software artifact of the plurality of software artifacts and (2) a second call graph that was generated for a second software artifact of the plurality of software artifacts;
combining the set of call graphs to generate a merged call graph;
identifying one or more portions of the merged call graph that will not be called or executed at runtime;
pruning the one or more portions of the merged call graph to generate a pruned call graph;
storing annotation data that associates elements in the pruned call graph with the set of one or more dependencies for each software artifact of the plurality of software artifacts;
based on the annotation data, identifying a set of reachable dependencies;
based on the set of reachable dependencies, generating a set of one or more security policies for the software application, wherein each security policy in the set of one or more security policies identifies a set of one or more dependencies or actions that the software application is allowed to make or call;
wherein the method is performed by one or more computing devices.

2. The method of claim 1, wherein the plurality of software artifacts include the first software artifact and one or more second software artifacts, wherein the first software artifact is the software application and the one or more second software artifacts are one or more libraries that the software application calls.

3. The method of claim 1, wherein the plurality of software artifacts comprise two or more of bytecode, assembly code, or source code.

4. The method of claim 1, wherein a plurality of types of dependencies reflected in the set of one or more dependencies for each software artifact of the plurality of software artifacts includes a system call, a TCP stack, a UDP stack, and a library call.

5. The method of claim 1, wherein a particular software artifact in the plurality of software artifacts comprises one or more entry points to the particular software artifact, one or more internal functions, and one or more function references to one or more other software artifacts.

6. The method of claim 1, wherein combining the set of call graphs comprises:
for each software artifact in a subset of the plurality of software artifacts:
  identifying one or more function references of said each software artifact;
  for each function reference of the one or more function references:
    identifying an entry point, in another software artifact of the plurality of software artifacts, to which said each function reference points;
    creating an association, in the merged call graph, between said each function reference and the entry point.

7. The method of claim 1, further comprising:
identifying one or more entry points for the software application;
for each entry point of the one or more entry points:
  determining whether said each entry point is reachable;
  storing first data that indicates that said entry point is reachable if it is determined that said each entry point is reachable;
  if it is determined that said each entry point is reachable, then:
    identifying a set of one or more nodes that are downstream of said each entry point;
    storing second data that indicates that said node in the set of one or more nodes is reachable;
wherein pruning one or more portions of the merged call graph comprises identifying one or more paths through the merged call graph, wherein, for each path in the one or more paths, no node in said each path is associated with data that indicates that the node is reachable.

8. The method of claim 1, wherein:
generating the set of one or more security policies for the software application comprises:
  for each reachable dependency in the set of reachable dependencies:
    determining a type of said each reachable dependency;
    adding said each reachable dependency to a security policy, in the set of one or more security policies, that is associated with the type.

9. The method of claim 1, further comprising:
storing the set of one or more security policies in a software container that comprises a plurality of software applications.

10. The method of claim 9, further comprising:
identifying one or more software artifacts, of the plurality of software artifacts, that are not invokable during execution of the software application;
storing, in the software container, the plurality of software artifacts except for the one or more software artifacts.

11. One or more non-transitory storage media storing instructions which, when executed by one or more computing devices, cause:
identifying a plurality of software artifacts associated with a software application;
for each software artifact of the plurality of software artifacts:
  generating a call graph for said each software artifact;
  adding the call graph to a set of call graphs for the software application; and
  detecting a set of one or more dependencies for said each software artifact;
wherein the set of call graphs includes (1) a first call graph that was generated for a first software artifact of the plurality of software artifacts and (2) a second call graph that was generated for a second software artifact of the plurality of software artifacts;
combining the set of call graphs to generate a merged call graph;
identifying one or more portions of the merged call graph that will not be called or executed at runtime;
pruning the one or more portions of the merged call graph to generate a pruned call graph;
storing annotation data that associates elements in the pruned call graph with the set of one or more dependencies for each software artifact of the plurality of software artifacts;
based on the annotation data, identifying a set of reachable dependencies;

based on the set of reachable dependencies, generating a set of one or more security policies for the software application, wherein each security policy in the set of one or more security policies identifies a set of one or more dependencies or actions that the software application is allowed to make or call.

12. The one or more non-transitory storage media of claim 11, wherein the plurality of software artifacts include the first software artifact and one or more second software artifacts, wherein the first software artifact is the software application and the one or more second software artifacts are one or more libraries that the software application calls.

13. The one or more non-transitory storage media of claim 11, wherein the plurality of software artifacts comprise two or more of bytecode, assembly code, or source code.

14. The one or more non-transitory storage media of claim 11, wherein a plurality of types of dependencies reflected in the set of one or more dependencies for each software artifact of the plurality of software artifacts includes a system call, a TCP stack, a UDP stack, and a library call.

15. The one or more non-transitory storage media of claim 11, wherein a particular software artifact in the plurality of software artifacts comprises one or more entry points to the particular software artifact, one or more internal functions, and one or more function references to one or more other software artifacts.

16. The one or more non-transitory storage media of claim 11, wherein combining the set of call graphs comprises:
for each software artifact in a subset of the plurality of software artifacts:
identifying one or more function references of said each software artifact;
for each function reference of the one or more function references:
identifying an entry point, in another software artifact of the plurality of software artifacts, to which said each function reference points;
creating an association, in the merged call graph, between said each function reference and the entry point.

17. The one or more non-transitory storage media of claim 11, wherein the instructions, when executed by the one or more computing devices, further cause:
identifying one or more entry points for the software application;
for each entry point of the one or more entry points:
determining whether said each entry point is reachable;
storing first data that indicates that said entry point is reachable if it is determined that said each entry point is reachable;
if it is determined that said each entry point is reachable, then:
identifying a set of one or more nodes that are downstream of said each entry point;
storing second data that indicates that said node in the set of one or more nodes is reachable;
wherein pruning one or more portions of the merged call graph comprises identifying one or more paths through the merged call graph, wherein, for each path in the one or more paths, no node in said each path is associated with data that indicates that the node is reachable.

18. The one or more non-transitory storage media of claim 11, wherein:
the set of one or more security policies includes a plurality of security policies that includes a first security policy for a first security mechanism and a second security policy for a second security mechanism that is different than the first security mechanism.

19. The one or more non-transitory storage media of claim 11, wherein the instructions, when executed by the one or more computing devices, further cause:
storing the set of one or more security policies in a software container that comprises a plurality of software applications.

20. The one or more non-transitory storage media of claim 19, wherein the instructions, when executed by the one or more computing devices, further cause:
identifying one or more software artifacts, of the plurality of software artifacts, that are not invokable during execution of the software application;
storing, in the software container, the plurality of software artifacts except for the one or more software artifacts.

* * * * *